United States Patent
Kekre et al.

(10) Patent No.: US 7,523,277 B1
(45) Date of Patent: Apr. 21, 2009

(54) TRANSIENT POINT-IN-TIME IMAGES FOR CONTINUOUS DATA PROTECTION

(75) Inventors: Anand A. Kekre, Pune (IN); Oleg Kiselev, Palo Alto, CA (US); Ankur P. Panchbudhe, Nagpur (IN)

(73) Assignee: Symantec Operating Corporation, Cupertino, CA (US)

( * ) Notice: Subject to any disclaimer, the term of this patent is extended or adjusted under 35 U.S.C. 154(b) by 270 days.

(21) Appl. No.: 11/094,007

(22) Filed: Mar. 30, 2005

(51) Int. Cl.
*G06F 13/00* (2006.01)
(52) U.S. Cl. ...................................... 711/162; 711/167
(58) Field of Classification Search ................. 711/162, 711/167
See application file for complete search history.

(56) References Cited

U.S. PATENT DOCUMENTS

| | | | | |
|---|---|---|---|---|
| 5,764,989 A | * | 6/1998 | Gustafsson et al. | 717/129 |
| 5,848,274 A | * | 12/1998 | Hamby et al. | 717/153 |
| 6,041,345 A | * | 3/2000 | Levi et al. | 709/217 |
| 6,351,265 B1 | * | 2/2002 | Bulman | 345/660 |
| 7,212,574 B2 | * | 5/2007 | Abrams et al. | 375/240.25 |
| 2003/0051255 A1 | * | 3/2003 | Bulman et al. | 725/135 |
| 2003/0185301 A1 | * | 10/2003 | Abrams et al. | 375/240.12 |

* cited by examiner

*Primary Examiner*—Reba I Elmore
(74) *Attorney, Agent, or Firm*—Campbell Stephenson LLP (57) ABSTRACT

A method, system, and apparatus that provide an equivalent of persistent frozen image snapshots through the use of a time-addressable storage object, such as a time-indexed storage volume, are presented. These virtual snapshot images are presented to a system in a manner such that the image is not persistent and therefore (i) do not take up additional storage resources, and (ii) reduce the amount of volume management overhead that must be maintained since information about the snapshot can be discarded when the snapshot is no longer needed.

18 Claims, 7 Drawing Sheets

TRANSIENT POINT-IN-TIME IMAGES FOR CONTINUOUS DATA PROTECTION

FIELD OF THE INVENTION

The field of this invention relates to data storage systems. Specifically, a method, system, and apparatus are presented to provide transient point-in-time snapshot images of data stored on a temporal storage.

BACKGROUND OF THE INVENTION

The ready ability for a business to store, process and transmit data is a facet of operations that a business relies upon to conduct its day-to-day activities. For a business that increasingly depends upon data for its operations, an inability to store, process, or transmit data can hurt the business' reputation and bottom line. Businesses are therefore taking measures to improve their ability to store, process, transmit, and restore data, as well as more efficiently sharing resources that enable these operations.

The ever-increasing reliance on data and the computing systems that produce, process, distribute, and maintain data in its myriad forms continues to put great demands on techniques for data protection and disaster recovery. Simple systems providing periodic backups of data have given way to more complex and sophisticated data protection schemes. Such schemes can take into consideration a variety of factors, including a wide variety of computing devices and platforms, memory storage systems, numerous different types of data to be protected, speed with which data protection operations must be executed, and flexibility demanded by today's users.

In many cases, disaster recovery involves restoring data to a point-in-time when the desired data was in a known and valid state. Backup schemes to ensure recoverability at times in the past are varied. Such schemes traditionally include periodic full backups followed by a series of differential backups performed at intervals between the full backups. In such a scheme, a data set can be restored at least to a point-in-time of a differential backup. Such an approach can be resource intensive as permanent records of the full and differential backups must be kept in order to ensure that one can restore a dataset to a state at a particular point-in-time, especially to a point in the distant past. Further, the process of restoring data from a full and a series of differential backups can be time and resource consuming, leading to delays in making the data available to the users. In addition, gaps in coverage can occur which are due to the time between differential backups.

A solution to some of the issues presented by data backup and restore from full and differential backups is to create a "snapshot" of data residing in a storage object. Typically, a snapshot involves capturing the data from a primary storage object to another storage object, real or virtual, at a particular instant without causing significant data access downtime. If desired, the resulting snapshot can then be backed up to permanent media, such as tape or optical media, without affecting the performance or availability of the primary storage object. One example of a snapshot backup is a mirror image broken off of a primary data volume.

A mirror image is a complete data copy stored on a separate storage object, virtual or real, physically independent of a primary data volume. Every change or write to data on the primary data volume is also made to the mirror. A mirror can be broken off from an associated primary data volume, meaning that changes after the split will be made to the primary but not to the broken-off mirror. Usually, the broken-off mirror is presented to applications as an independent storage object, often as another volume. While broken-off, this mirror can be backed up or otherwise manipulated. If the mirror will be used again, it must be brought up-to-date with the primary volume or "resynchronized." Since a mirror image provides a completely separate copy of data on the primary volume, mirror images can provide much faster restores in the event of primary volume unavailability and backups to permanent media (i.e., tapes, optical media), but mirror images require an amount of disk space equal to that of its primary data volume.

A snapshot may not need to be backed up to permanent media (e.g., tape), but instead can be used as a persistent frozen image (PFI). A PFI backup image will allow for a very fast restore of data in the event of problems occurring with a primary volume. But a primary drawback of this approach is that a PFI can take up a significant amount of disk space, whether virtual or real. Thus, it is impractical to retain a series PFI snapshots on disk space for long-term storage. Further, in order to be accessed, each PFI snapshot requires instantiation and storage of information related to the snapshot volume in, for example, a volume manager. Such instantiation also consumes resources.

As stated above, a typical backup scheme involves periodic full backups of data coupled with intermediate scheduled differential backups, along with, in many instances, recording a continuing log of transactions that occur to the primary data volume. Snapshot image backups can be incorporated into such a scheme. Restoring data in such a scheme involves going back to the last full backup or snapshot before the event necessitating a restore, restoring the full backup and then restoring each subsequent differential backup, and finally bringing the data up to a particular point and time through the use of a transaction log. Such a scheme can take a very long time to restore data.

Information technology departments are faced with data demands that require few, if any, gaps in protection of data, along with as little unavailability of data as possible in the event of a data volume failure. Such continuous data protection demands can be solved, in part, through the use of multiple PFI snapshots of the data, but such a protection scheme is resource intensive at both the storage volume level and in the management of those storage volumes as they are presented to the computer systems that use the data. What is therefore desired is a method of maintaining PFI snapshot images, or their equivalent, in a manner that minimizes resource consumption at both the disk level and at the volume manager level.

SUMMARY OF THE INVENTION

The present invention presents a method, system, computer program product, and apparatus that provide the virtual equivalent of PFI snapshot images through the use of a time-addressable (temporal) storage, such as a time-indexed storage volume. These virtual snapshot images are presented in a manner such that the images are not persistent and therefore do not take up additional storage resources, and also reduce the amount of volume management overhead that must be maintained since information about the snapshot can be discarded when the snapshot is no longer needed.

In one embodiment of the present invention, a method, system, computer program product, and apparatus for presenting a non-persistent image of data stored in a storage object, such as a volume, at a selected point in time is described. The image of data corresponds to data stored in a time-addressable storage object, such as a temporal volume.

In one aspect of the above embodiment, presenting the non-persistent image of data involves modifying a request for data directed to the image to include temporal addressing. The temporal addressing references the selected point in time. The modified request for data is then provided to the time-addressable storage. The time-addressable storage can be represented by a virtual storage object, such as a temporal volume, to which the modified request for data is directed.

In another aspect of the above embodiment, presenting the non-persistent image of data involves providing a catalog, or index, of the storage object for the selected point in time. Such a catalog can reference locations of data present on the storage object at the selected point in time. The catalog can take the form of a mapping structure, wherein blocks in the image are coupled to locations of data stored on the time-addressable storage object at the selected point in time. Such data can be stored either on the time-addressable storage or a snapshot of the storage object. For a request for data directed to the image, the catalog can be referenced to determine the location of the requested data and that data can be accessed from either the time-addressable storage or the snapshot.

In a further aspect of the above embodiment, a write operation to the said image can be performed by storing data provided by the write operation to a computer memory while not modifying the contents of the time-addressable storage. Such computer memory can take the form of a persistent storage, core memory, or cache memory.

In another aspect of the above embodiment, a remote client can be provided access to the image. The remote client can manipulate the image as a second storage object, wherein the second storage object can be seen as a virtual snapshot of the data stored in the storage object at the selected point in time.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides the equivalent of PFI snapshot images through the use of a time-addressable storage object, such as a time-indexed storage volume, in conjunction with a volume presentation system, such as a volume manager. These virtual snapshot images are then presented in a manner such that the snapshot images are not persistent. Therefore the virtual snapshot images do not take up additional storage resources, reducing the amount of volume management overhead that must be maintained, because information about the snapshot can be discarded when the snapshot is no longer needed.

Time-Addressable Storage

One approach to providing a less resource-intensive (than PFI snapshot images) capacity to restore a primary data volume to a particular point-in-time is time-addressable storage, also known as time-indexed storage and temporal storage. A time-addressable storage maintains both a present state of and a history of data stored in the time-addressable storage, thus providing a way for an application to retrieve a copy of the data at any time in the past.

Time-addressable storage objects, such as temporal volumes, provide an infrastructure for maintaining and accessing temporal data. Time-addressable storage objects can be used as building blocks for data archiving, versioning, replication and backup through integration with file system, volume management, and backup products. Time-addressable storage objects may preserve all content stored to them at all points of time, so that the content can be used at a later point-in-time for snapshots, incremental backups, replication, restoring corrupted volumes or deleted files, and so on.

Normally, when data changes, a data block in a volume is changed in situ. In a time-addressable storage object implemented as a temporal volume, when a block of data is changed, the existing block can be preserved and a new data block can be written to a separate location and associated with a time stamp and possibly other information needed to preserve the order of write operations in cases where applications perform writes in multiple concurrent streams; metadata or indexes in the temporal volume are also manipulated to provide a link to the new data block. Old versions of a data block (i.e., recorded with earlier time stamps) are maintained even when the data block is deleted. This achieves the effect of maintaining copies of one or more states of the data in the past. This process can also be thought of as continuous versioning of the data in the volume. Temporal storage implementations can provide the same effect of maintaining data at points-in-time by preserving an existing block along with some record of the time of change and then writing the new data block to the device.

There are a variety of temporal volume implementations. In one implementation, contents of a temporal volume can be preserved using an indexing system or structure. An indexing structure can be formed using a space-optimized persistent store by allocating the storage over a cache object. A cache object is a logical storage object that gives an illusion of potentially infinite storage capacity, while using only limited actual storage resources. The cache object accomplishes this by provisioning storage resources on an as-needed basis. In another implementation, a temporal volume can be divided into one or more regions. A region may be anywhere from one physical block of the disk to kilobytes, megabytes, gigabytes, and so on. Each region can have an associated time stamp. Applications accessing the temporal volume can specify the time stamps associated with each region.

A temporal volume can be configured to store every change that happens to every block of data. But practically, users may be interested in storing only certain changes or images of the data at only specific points-in-time or after a defined event. The points at which data is stored on a temporal volume are "checkpoints" of the data. As discussed below, checkpoints can be linked, for example, to the passage of time, the number of changes to associated data, or to a quantity of changes in a section of a volume. Defining the regularity and system of checkpointing can be done by setting a temporal granularity attribute, which is a policy describing when the changes to data on a temporal volume should be stored. The policy will define when a new checkpoint or image of the data on the volume is created internally. Temporal granularity of data can be supplied and maintained in a temporal volume in several ways, including, but not limited to: zero granularity (also known as continuous checkpointing), periodic granularity (also known as regular checkpointing), fixed change granularity, N-change granularity, and application-controlled checkpointing.

A temporal volume configured with zero granularity, or continuous checkpointing, maintains every change to the data stored on that volume. That is, whenever a data block is modified, the modification to the data block is recorded and associated with a time stamp reflecting the time of change. Additionally, a write operation ordering data may be stored with the data block to disambiguate update ordering in near-concurrent write operations that exceed a time stamp mechanism's ability to resolve the order.

In general, a time stamp is distinct from the concept of a checkpoint. A checkpoint can be an index point at which modified data is recorded, while a time stamp reflects the time of the data modification. This distinction becomes clearer with the subsequently discussed granularity methods. When a data block is recorded at a checkpoint, the previous version of the data block is also maintained.

Periodic granularity, or regular checkpointing, represents a scenario in which changes to data are stored only at periodic intervals in time. For example, if the granularity is set to two minutes, then the only consistent images of data in the temporal volume will be available at the end of each 2 minute interval. In other words, using periodic granularity, it may be impossible to reproduce a consistent state of the data image as it was at a moment in time sometime between the beginning and the end of the interval.

In a temporal volume with an N-change temporal granularity policy, the state of changes to a block of data or a set of data will be retained with a time stamp only when a set number of modifications to the data have been made.

A similar granularity policy is a fixed-change granularity, where changes to a volume are checkpointed and retained when a set amount of data has changed on the volume. For example, if a granularity attribute is set to ten megabytes, then when ten megabytes of data changes on the volume, all modified blocks since the previous time stamp are associated with a checkpoint and retained.

In an application-controlled checkpointing policy, changed data is checkpointed only when an application tells the temporal volume to checkpoint a block of data, a file, a region of data, or the entire volume of data. In application-controlled checkpointing, an application issues an input/output (I/O) request that specifies a new checkpoint should be created within the temporal volume, rather than providing a time stamp with every write.

A temporal volume can be provided by, for example, a volume manager configured to support temporal volumes, or a temporal storage appliance. A temporal storage appliance may include, in addition to a temporally structured volume, non-temporally structured storage, real or virtual, as an aide in mirroring and data recovery. Temporal volumes are typically made part of a volume set by storage virtualization provided by a volume manager.

Using Time-Addressable Storage to Create Non-Persistent Snapshots

As stated above, a snapshot image of a storage object is a duplicate of the state of that storage object at the point-in-time at which the snapshot was created. Incorporating a time-addressable storage object into the process of creating a snapshot image introduces a new level of flexibility. Since a time-addressable storage object retains the state of the associated storage object as of each checkpoint recorded in the time-addressable storage object, snapshot images of data associated with a time-addressable storage object can be created at any time for any time during the operation of the time-addressable storage object.

Using a time-addressable storage object in the snapshot process has a further advantage in that a time-addressable storage object-based snapshot will not consume additional storage beyond that already consumed by the time-addressable storage object. Since the state of data over time is recorded on the time-addressable storage object, one need only provide appropriate time signatures to read or analyze data resident on the time-addressable storage object at a chosen point in time. The specific method of accessing data at a point in time recorded on a time-addressable storage object will differ depending upon the implementation of the time-addressable storage object, but typically one can access such data with a read command and an associated desired time, or one could directly access such data through an index or catalog referencing blocks containing data present on the time-addressable storage object at the specified point in time.

Since a time-addressable storage object contains the state of data on the associated storage object at all points-in-time recorded on the time-addressable storage object, snapshot images can be created on the fly and need not be retained for future use since they can be easily recreated. In light of the ability to easily create and recreate snapshots, snapshots can be presented to a host system in a non-persistent manner whereby the snapshot images are temporary storage objects whose associated information is retained only for the duration of the snapshot image. Such non-persistent presentation of snapshot images can be provided, for example, by a volume manager controlling, among other things, a temporal volume, or another utility or system designed to provide an abstraction of underlying data to a computing node.

Figure 1:
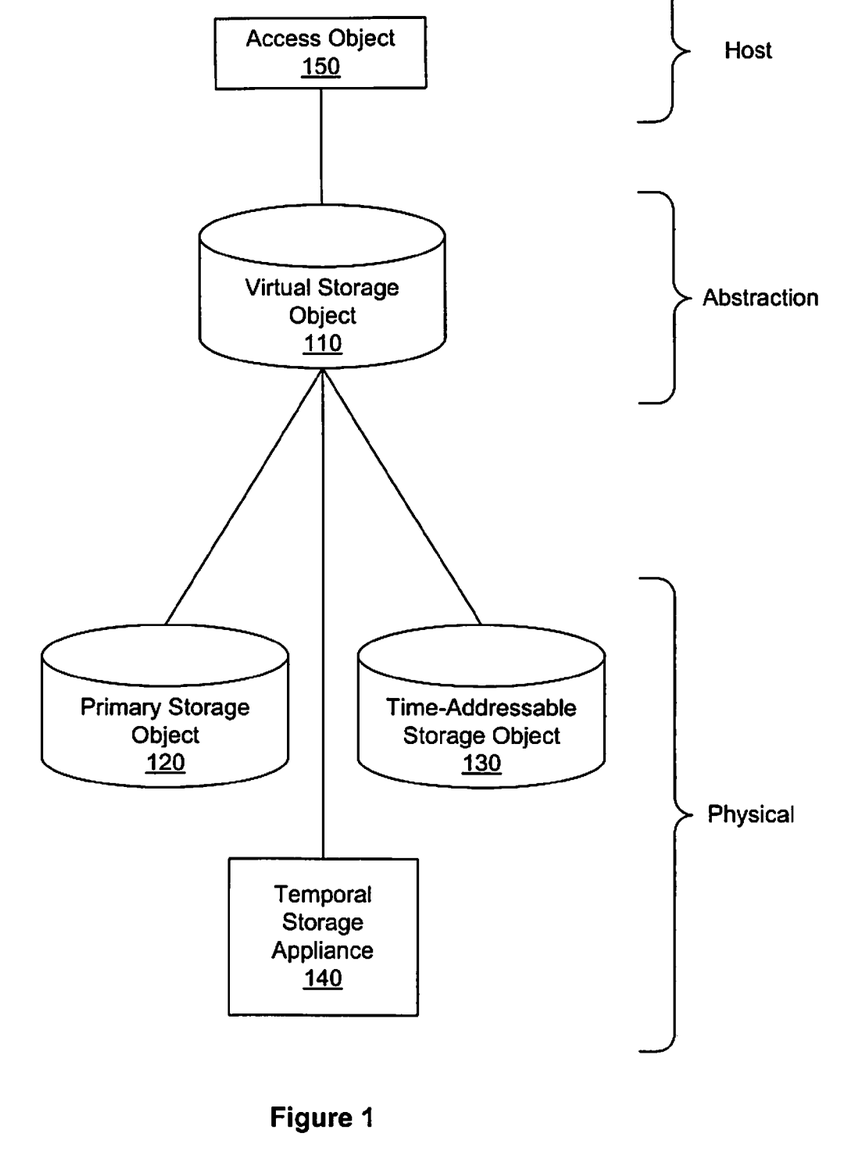
FIG. 1 is a simplified block diagram illustrating levels of representation of storage devices.

FIG. 1 is a simplified block diagram illustrating levels of representation of storage devices. For the purposes of this discussion, these levels of abstraction are the physical level, the abstraction level, and the host level. The actual data storage devices reside at the physical level. Such physical devices can be coupled to one another and to network computing nodes through a number of well-known storage networks including storage-area network (SAN) and network-attached storage (NAS), or directly coupled to a host through, for example, a small computer systems interface (SCSI) connection. FIG. 1 illustrates a volume that includes a primary storage object 120 which stores the current state of data, and a time-addressable storage object 130, here a temporal volume, containing, as has been described above, information that allows access to images and states of data at some or all points of time in the past. Alternatively, the functionality of a time-addressable storage object can be provided by a temporal storage appliance 140. Such temporal storage appliances may include, in addition to a temporally-structured storage, non-temporally-structured storage to aide in improving data redundancy (through mirroring or other mechanisms) and data recovery. Temporal storage appliances can add another level of abstraction as discussed below.

The abstraction level presents the physical devices to coupled host-level devices as a virtual storage object 110. Such a storage object can typically take the form of a logical volume, which can in turn represent an aggregate of physical devices or virtual storage objects that provide functionality such as mirroring, RAID, multi-volume storage objects, and so on. A temporal volume can be coupled in a storage object with a standard volume and can function as a mirror of the standard volume.

The abstraction level presents a storage object to the host level, which can create an access object 150 through which a host can provide, manipulate, and read data to/from the storage object 110. Such an access object can be a mount point accessed, for example, by a hosts' file system. It should be noted that an abstraction level utility can reside directly on a compute node that also functions at the host level or on a separate node.

The abstraction level provides an interface between the host level and the physical level. The abstraction level can therefore be used to present a non-persistent storage object corresponding to a virtual snapshot formed from data residing on a temporal volume. Such an interface can be structured so that the host level interacts with the non-persistent snapshot storage object in the same manner the host would interact with any other storage object, without the need to provide temporal-volume-specific handles.

Figure 2:
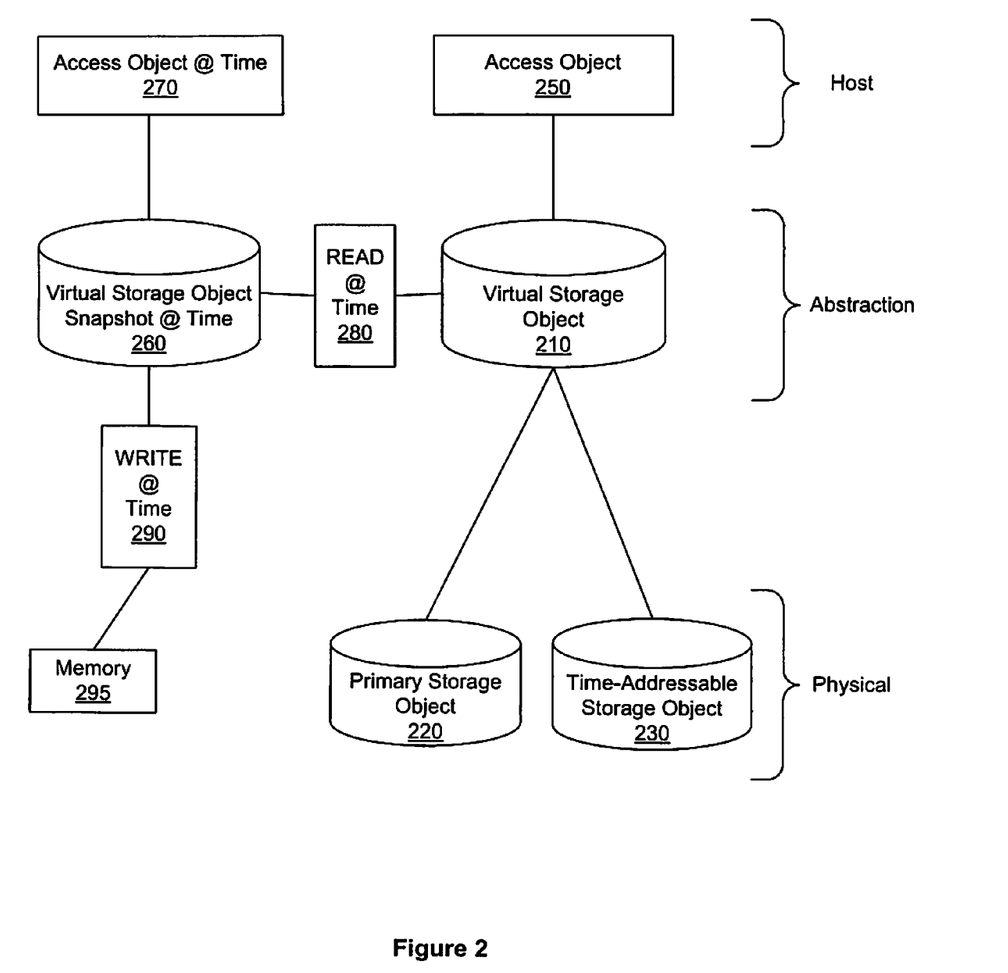
FIG. 2 is a simplified block diagram illustrating a means for presenting a time-addressable storage object based snapshot image through the use of an abstraction level utility in accord with one embodiment of the present invention.

FIG. 2 is a simplified block diagram illustrating a means for presenting a snapshot image through the use of an abstraction level utility in accord with one embodiment of the present invention. As in FIG. 1, physical, abstraction, and host levels are presented. Virtual storage object 210 is an abstraction level representation of a primary storage object 220 and a time-addressable storage object 230, the combination of which is presented to a host level as a mirrored volume. The host level accesses storage object 210 through an access object 250.

When the abstraction level utility receives a request from the host level to generate a snapshot image at a specified time, a new virtual storage object 260 can be created in the abstraction layer and coupled with virtual storage object 210. This new virtual storage object represents a snapshot of virtual storage object 210 at the specified time and is then presented to the host level, which can access the virtual storage object through access object 270, which can be conceptualized as an accessible and consistent image of the data storage contents as it existed at the specified time. When the host level submits a read request to access object 270, the abstraction layer then performs a translation of that read request to a temporal read that includes the specified time. Such a translation is illustrated in FIG. 2 by a translation module 280 interposed in the coupling between virtual storage object 260 and virtual storage object 210, wherein the standard read request from the host is modified to include the snapshot time specified in accord with the access protocols for time-addressable storage object 230. Thus, the standard read request is converted to a temporal read request, which is used to access the data stored on the time-addressable storage object 230 as of the requested time.

The abstraction level can also permit write requests to be directed at virtual storage object 260, but will not store write data in time-addressable storage object 230. Instead, a write request 290 will be cached in computer memory 295, which can be core memory, non-core memory, a persistent store other than time-addressable storage object 230, or some other form of computer-accessible memory.

In this manner, the host level can interact with access object 270 as it would with a standard snapshot image presented by the abstraction level. But storage object 260 is a non-persistent virtual image of storage object 210. Such a virtual image will not tax the resources of an abstraction level utility because the virtual image only contains links to appropriately configured read and write translation modules, and the virtual image can be removed from the abstraction level when the host level no longer needs access to the snapshot.

Figure 3:
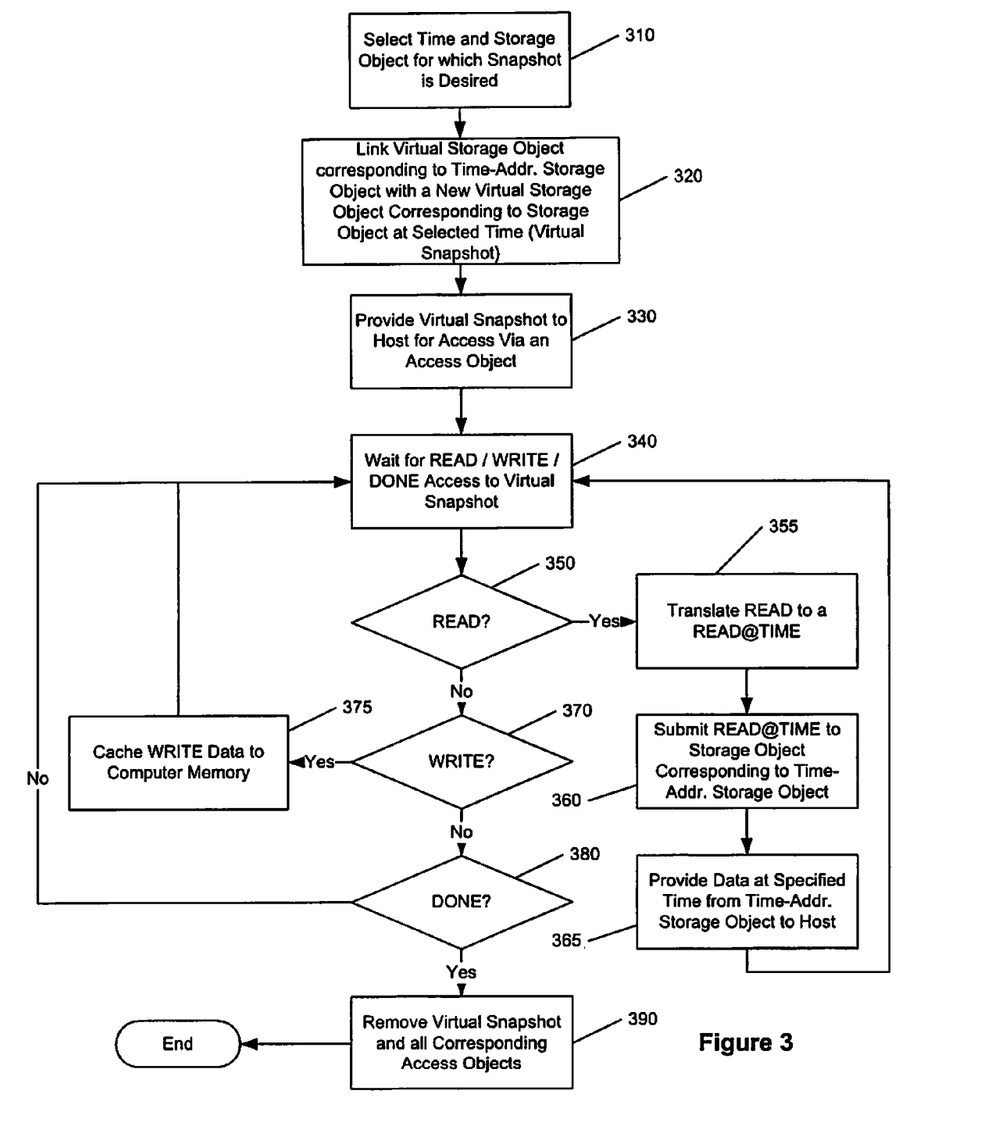
FIG. 3 is a simplified flow diagram illustrating a method for presenting a non-persistent snapshot virtual storage object in accord with one embodiment of the present invention.

FIG. 3 is a simplified flow diagram illustrating a method for presenting a non-persistent snapshot virtual storage object as illustrated in FIG. 2. A point in time at which a snapshot image is desired is selected (310), typically by a user or application at the host level, and then provided to the abstraction level (e.g., a volume manager). The abstraction level then links a virtual storage object corresponding to a time-addressable storage object associated with the selected virtual storage object (e.g., 210) with a new virtual storage object (e.g., 260) corresponding to the selected storage object at the selected time (320). The new virtual storage object is provided to the host level which accesses the new virtual storage object through an access object (e.g., 270) (330). The abstraction level will then wait for read/write/done access to the new virtual storage object (340).

When the abstraction level receives a read request from the host directed to the virtual snapshot (350), the abstraction level will translate the read request to a read at the time specified in 310 (355). The read at the specified time can then be submitted to the virtual storage object corresponding to time-addressable storage object (360), which in turn can access the time-addressable storage object using an appropriate protocol. Any data received in response to the read request can then be provided to the host level through the abstraction level (365).

If a write request directed to the virtual snapshot is received (370), data being written will not be provided to the time-addressable storage object. Instead, the data being written can be cached in computer memory (375), which can take the form of either non-persistent or persistent storage depending upon the application.

Should the abstraction level receive an indication from the host level that the host level is done with the snapshot (380), then the abstraction layer can remove the storage object corresponding to the snapshot and the host can remove all access objects to the storage object (390). In this manner, the resources of the abstraction level utility (e.g., a volume manager) will not be burdened with objects relating to snapshot images no longer needed.

Figure 4:
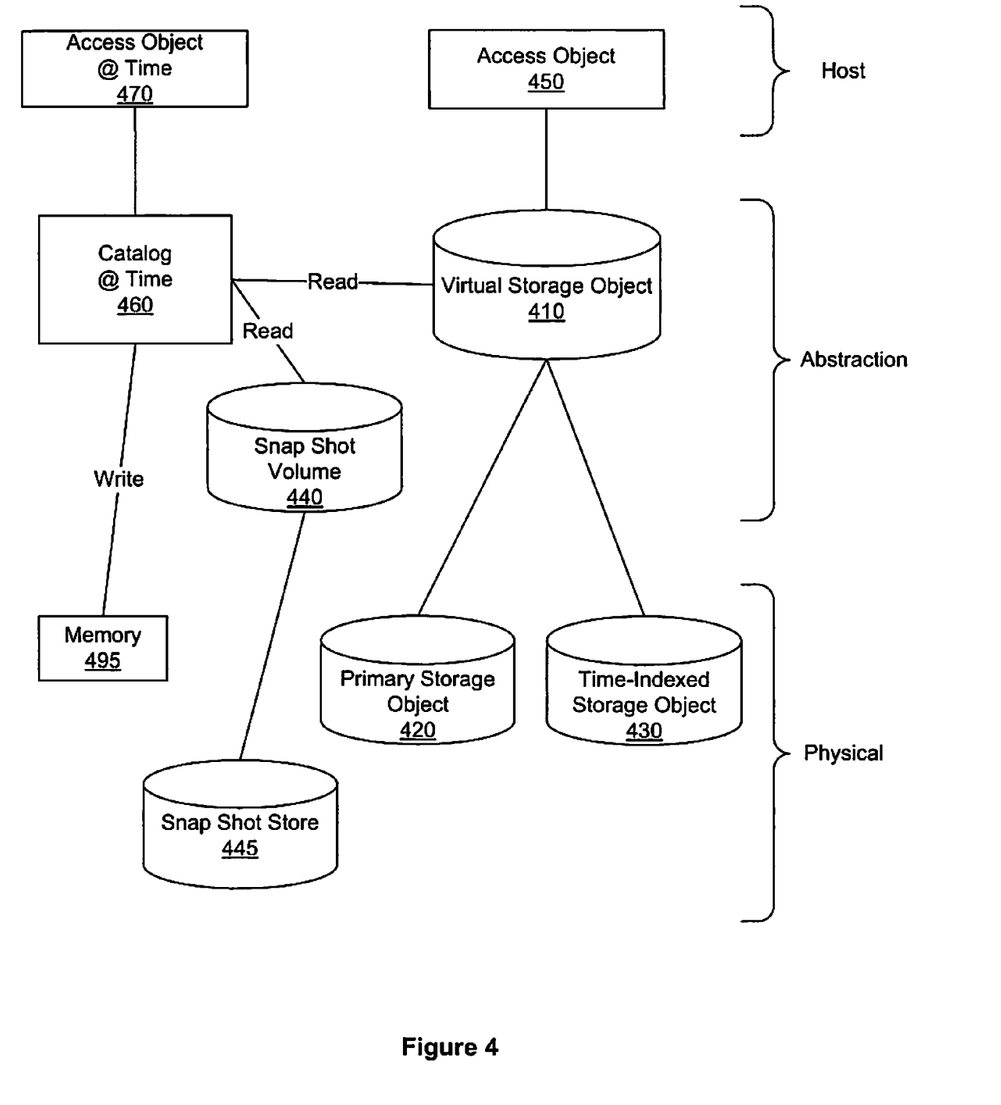
FIG. 4 is a simplified block diagram illustrating a means for presenting a time-addressable storage object based snapshot image through the use of an abstraction level utility in accord with another embodiment of the present invention.

FIG. 4 is a simplified block diagram of a system in accord with another embodiment of the present invention. As in FIG. 1, physical, abstraction, and host levels are presented. An abstraction level storage object 410 is coupled to the physical level containing a primary storage object (420) and a time-indexed storage object mirror thereof (430). The abstraction level also contains a representation of a snapshot data volume (440) coupled to a physical device storing a standard persistent snapshot of the data represented by storage object 410

(445). This persistent snapshot image can represent the state of the data on storage object 420 at some fixed point-in-time. In this embodiment, upon receiving a request to generate a virtual snapshot of the data represented by virtual storage object 410 at a specified point-in-time, the abstraction level can direct time-indexed storage object 430 to generate a catalog (or index) that provides access to blocks stored on the time-indexed storage object that represent the state of data on the storage object at the specified point-in-time. Such a catalog can be maintained in computer memory in a non-persistent manner by an abstraction level utility (460), which can then be presented to the host level via access object 470, in the same manner that the host level accesses a standard access object (e.g., 450).

In some implementations it may be possible to not generate a complete catalog of blocks corresponding to the specified point-in-time before allowing access to the virtual point in time snapshot. Instead, it may be possible to generate a partial catalog that references some explicitly or implicitly specified ranges of blocks and allow quicker access to the point-in-time data images. The missing parts of this catalog then may be generated at a later point, perhaps when access request to the blocks not yet mapped by the catalog is received by the abstraction layer.

In the embodiment shown in FIG. 4, host level read requests to access object 470 are directed to underlying storage through the non-persistent catalog 460. The catalog 460 directs some read requests directly to data stored on the time-indexed storage object abstraction 410. As with the embodiment in FIG. 2, write requests sent to object 470 will not be stored on the temporal storage object, but rather will be directed to a persistent or non-persistent computer memory 495. This embodiment can also allow for catalog 460 to be coupled with standard snapshot 440. Such coupling can be accomplished because snapshot 440 can be implemented using a cache object, which is itself catalog- or index-based. This can allow for data to be accessed either from the standard snapshot (if appropriate) or the time-indexed storage object 430.

Figure 5:
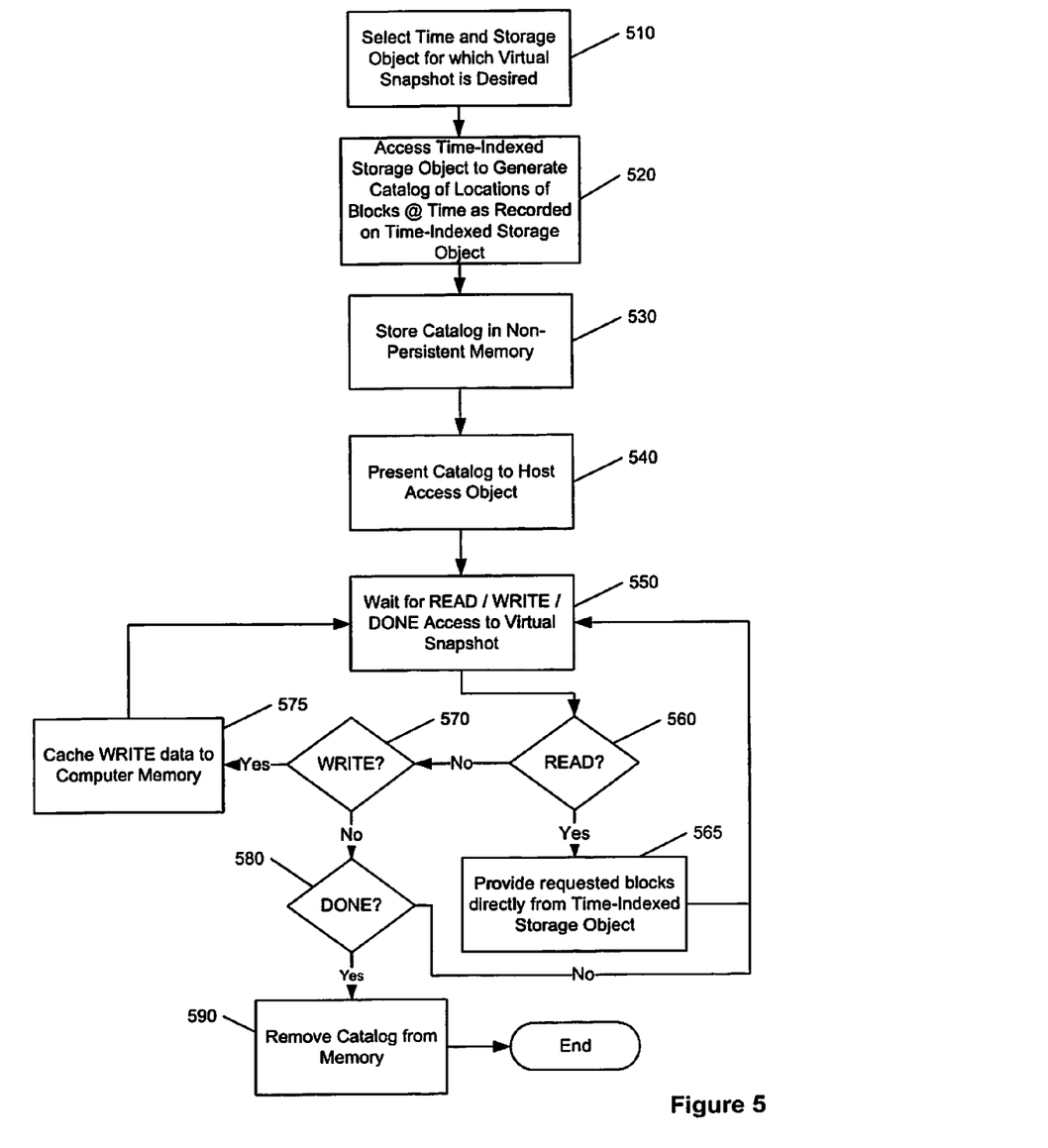
FIG. 5 is a simplified flow diagram illustrating a method for presenting a non-persistent snapshot virtual storage object in accord with another embodiment of the present invention.

FIG. 5 is a simplified flow diagram illustrating steps that can be carried out in the above-described, catalog-based embodiment of the present invention. Initially, the abstraction level receives a selection from the host level as to the time at which a virtual, non-persistent snapshot is desired (510). The abstraction level then accesses a time-indexed storage object to generate a catalog of locations of blocks (indexes) representing the state of data on the selected volume at the selected time (520). The catalog is stored in non-persistent memory by the abstraction level (530). That non-persistent stored catalog is then presented to the host level (540), where host-level applications can access data blocks listed in the catalog through an access object.

The abstraction level can then wait for read, write, or done operations from the host level directed toward the virtual snapshot (550). For a read operation (560), the abstraction level accesses and provides data from blocks stored on the time-indexed volume as specified by the catalog (565). For a write request (570), the information provided in the write request is cached to computer memory, either persistent or non-persistent. Subsequent read access requests to the data created or modified by these write requests will be routed to the new locations of the data in computer cache memory. When the abstraction level receives an indication from the host level that the host is done using the virtual snapshot (580), the abstraction layer can remove the catalog and all references to the catalog from memory (590) while the host level removes access objects corresponding to the catalog. The cache memory that stores writes sent to the removed virtual snapshot can also be freed and reused at this point.

As stated above, physical level devices can also include a temporal storage appliance (e.g., 140). A temporal storage appliance can add another layer of abstraction within the appliance itself. A temporal storage appliance can include a current store of volume and a temporal store of the volume. Requests to the temporal storage appliance for data at a specific point-in-time can be responded to by internally creating and storing an image of data stored on the associated volume and presenting that image to the abstraction level as a logical unit number (LUN). The LUN is an abstraction of the data stored in the temporal storage appliance. The LUN can be accessed by an abstraction level utility as with any other device. Typically, with temporal storage appliance-based snapshots, each snapshot LUN created within the temporal storage appliance and presented to the volume manager requires a corresponding abstraction level storage object as with any LUN. However, using an embodiment of the present invention, a temporal storage appliance can be assigned a single storage object at the abstraction level (e.g., 110), which can in turn be coupled with a virtual storage object such as 260 corresponding to a virtual snapshot at a selected point-in-time. The temporal storage appliance can also internally generate the snapshot image from the temporal data. Read and write accesses to the virtual snapshot can then be translated in a fashion similar to that described for FIGS. 2 and 3 but here such translation would refer to the internally generated snapshot image within the temporal storage appliance. In this fashion, the benefits of a temporal storage appliance can be realized while at the same time conserving the resources of the abstraction level by providing only non-persistent storage objects corresponding to the virtual snapshot images.

An Example Computing and Network Environment

As shown above, the present invention can be implemented using a variety of computer systems and networks. An example of one such computing and network environment is described below with reference to FIGS. 6 and 7.

Figure 6:
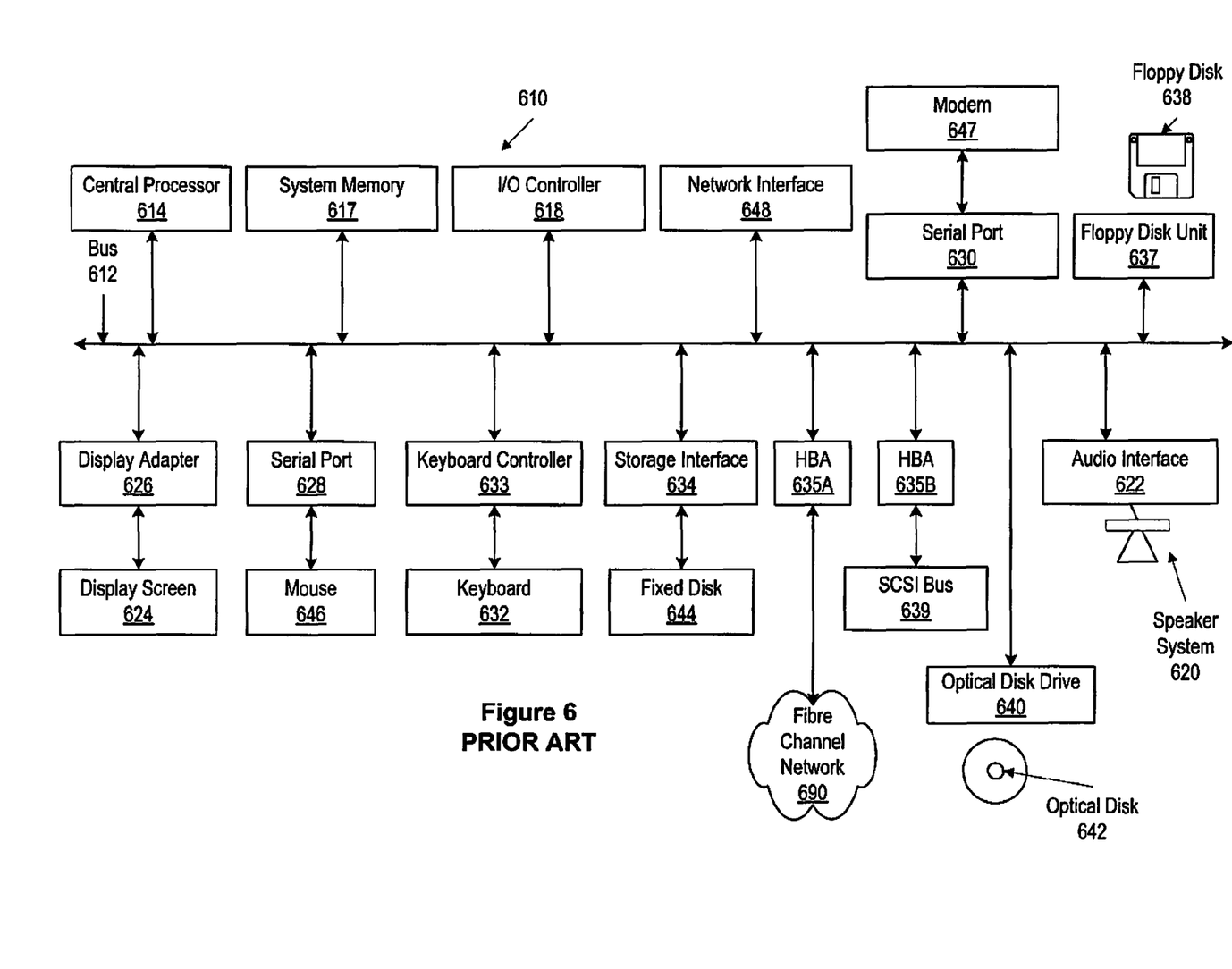
FIG. 6 depicts a block diagram of a computer system suitable for implementing embodiments of the present invention.

FIG. 6 depicts a block diagram of a computer system 610 suitable for implementing the present invention. Computer system 610 includes a bus 612 which interconnects major subsystems of computer system 610, such as a central processor 614, a system memory 617 (typically random access memory (RAM), but which may also include read only memory (ROM), flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a fibre channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an Internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, optical disk 642, or floppy disk 638. Additionally, computer system 610 can be any kind of computing device using an operating system that provides necessary data access features and capabilities.

Figure 7:
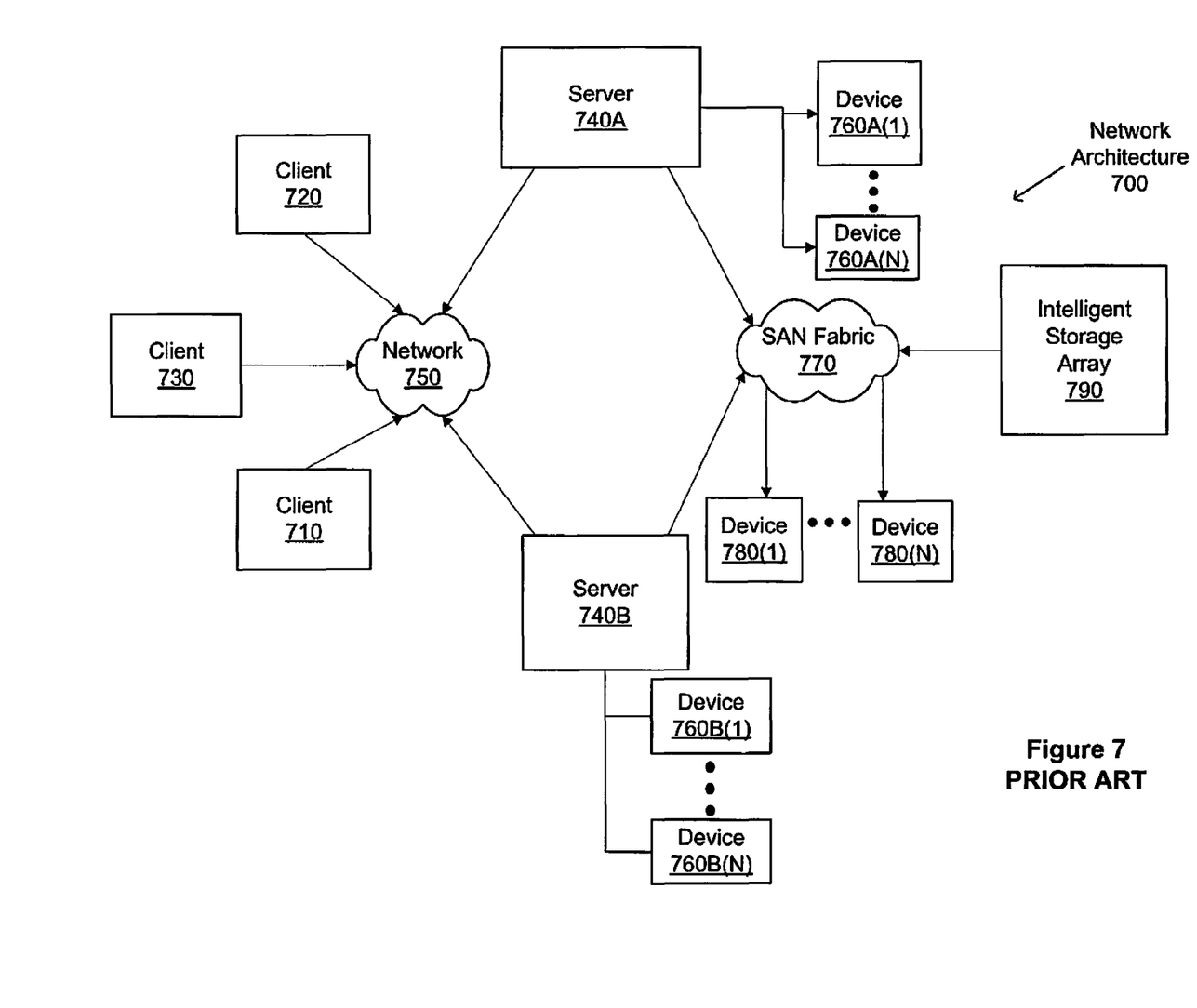
FIG. 7 is a block diagram depicting a network architecture suitable for implementing embodiments of the present invention.

FIG. 7 is a block diagram depicting a network architecture 700 in which client systems 710, 720 and 730, as well as storage servers 740A and 740B (any of which can be implemented using computer system 610), are coupled to a network 750. Storage server 740A is further depicted as having storage devices 760A(1)-(N) directly attached, and storage server 740B is depicted with storage devices 760B(1)-(N) directly attached. Storage servers 740A and 740B are also connected to a SAN fabric 770, although connection to a storage area network is not required for operation of the invention. SAN fabric 770 supports access to storage devices 780(1)-(N) by storage servers 740A and 740B, and so by client systems 710, 720 and 730 via network 750. Intelligent storage array 790 is also shown as an example of a specific storage device accessible via SAN fabric 770.

With reference to computer system 610, modem 647, network interface 648 or some other method can be used to provide connectivity from each of client computer systems 710, 720 and 730 to network 750. Client systems 710, 720 and 730 are able to access information on storage server 740A or 740B using, for example, a web browser or other client software (not shown). Such a client allows client systems 710, 720 and 730 to access data hosted by storage server 740A or 740B or one of storage devices 760A(1)-(N), 760B(1) (N), 780(1)-(N) or intelligent storage array 790. FIG. 7 depicts the use of a TCP/IP network for exchanging data, but the present invention is not limited to any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 610). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   presenting an image of data stored in a storage object at a selected point in time, wherein
      the image is not persistent,
      the image corresponds to data stored in a time-addressable storage object, and
      the time-addressable storage object can preserve a copy of the data stored in the storage object at a plurality of points in time;
   modifying a request for data directed to the presented image of data to include temporal addressing, wherein the temporal addressing references the selected point in time; and
   providing the modified request for data to the time-addressable storage object.

2. The method of claim 1 wherein the storage object is a volume.

3. The method of claim 1 wherein the time-addressable storage object is a temporal volume.

4. The method of claim 1 further comprising:
   representing the time-addressable storage object using a first virtual storage object, wherein
      said providing the modified request for data is directed to the first virtual storage object.

5. The method of claim 1 wherein said presenting the image of data stored in the storage object at the selected point in time comprises:
   providing a catalog of the storage object for the selected point in time, wherein
      the catalog references locations of data present in the storage object at the selected point in time.

6. The method of claim 5 wherein the catalog comprises:
   a mapping structure, wherein
      components in the image are coupled to locations of data present in the storage object at the selected point in time, wherein
         the data is stored on one or more of the time-addressable storage object and a snapshot of the storage object.

7. The method of claim 6 wherein the components are blocks of data.

8. The method of claim 6 further comprising:
   for any request for data directed to the image,
      referencing the catalog to determine the location of the requested data in the storage object, and
      accessing the requested data from the one or more of the time-addressable storage object and the snapshot of the storage object.

9. The method of claim 1 further comprising:
   performing a write operation to the image of the storage object, wherein
      a block provided by the write operation is cached in computer memory, and
      a data component of the block provided is not committed to the time-addressable storage.

10. The method of claim 1 further comprising:
    providing a remote client access to the image, wherein
       the remote client manipulates the image as a second storage object.

11. The method of claim 10, wherein
    the second storage object is a virtual snapshot of the data stored on a storage object at the selected point in time.

12. A system comprising:
    a storage object;
    a time-addressable storage object, wherein
       the time-addressable storage object comprises a current state of data and a state of the data at a selected point in time; and
    an abstraction level utility coupled to the storage object and the time-addressable storage object and configured to
       present an image of the data stored on the time-addressable storage object at the selected point in time, wherein
          the image is not persistent, and
          the time-addressable storage object can preserve a copy of the data stored in the storage object at a plurality of points in time,
       modify a request for data directed to the image to include temporal addressing, wherein
          the temporal addressing references the selected point in time, and
       provide the modified request for data to the time-addressable storage object.

13. The system of claim 12 further comprising:
    a catalog of the state of the data at the selected point in time, wherein the catalog is provided by the abstraction level utility,
       the image comprises the catalog, and
       the catalog comprises a mapping structure, wherein
          components in the image are coupled to locations of data present in the time-addressable storage object at the selected point in time, wherein
             the data is stored in one or more of the time-addressable storage object and a snapshot of the storage object.

14. The system of claim 12 further comprising:
    a computer memory coupled to the abstraction level utility, wherein
       the abstraction level utility is further configured to perform a write operation to the image, wherein
          a block provided by the write operation is cached in the computer memory, and
          a data component of the block provided is not committed to the time-addressable storage.

15. A computer-readable storage medium comprising:
    a first set of instructions, executable on a computer system, configured to present an image of data stored in a storage object at a selected point in time, wherein
       the image is not persistent,
       the image corresponds to data stored in a time-addressable storage object, and
       the time-addressable storage object can preserve a copy of the data stored in the storage object at a plurality of points in time;

a second set of instructions, executable on the computer system, configured to modify a request for data directed to the presented image to include temporal addressing, wherein the temporal addressing references the selected point in time; and a third set of instructions, executable on the computer system, configured to provide the modified request for data to the time-addressable storage object.

16. The computer-readable storage medium of claim 14 wherein the first set of instructions comprises:

a fourth set of instructions, executable on the computer system, configured to provide a catalog of the storage object for the selected point in time, wherein the catalog comprises a mapping structure, wherein components in the image are coupled to locations of data present in the storage object at the selected point in time, wherein the data is stored on one or more of the time-addressable storage object and a snapshot of the storage object.

17. An apparatus comprising:

a storage object;

means for presenting an image of data stored in the storage object at a selected point in time, wherein the image is not persistent, the image corresponds to data stored in a time-addressable storage object, and the time-addressable storage object can preserve a copy of the data stored in the storage object at a plurality of points in time;

means for modifying a request for data directed to the presented image to include temporal addressing, wherein the temporal addressing references the selected point in time; and means for providing the modified request for data to the time-addressable storage object.

18. The apparatus of claim 17 wherein said means for presenting the image of the volume at the selected point in time comprises:

means for providing a catalog of the storage object for the selected point in time, wherein the catalog references locations of data present in the storage object at the selected point in time.

* * * * *